(12) United States Patent
McCormick (10) Patent No.: US 6,505,871 B2
(45) Date of Patent: Jan. 14, 2003

(54) ELECTRIC GRIPPER (75) Inventor: Peter Elliot McCormick, Dallas, TX (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 09/861,700

(22) Filed: May 21, 2001

(65) Prior Publication Data

US 2002/0171254 A1 Nov. 21, 2002

(51) Int. Cl.[7] .............................................. B25J 15/08
(52) U.S. Cl. ........................ 294/119.1; 294/907; 901/38
(58) Field of Search .......................... 294/86.4, 88, 93, 294/94, 103.1, 116, 119.1, 907; 269/217, 229, 232, 233; 279/4.1, 114, 121; 901/36–39, 46

(56) References Cited

U.S. PATENT DOCUMENTS

| | | | |
|---|---|---|---|
| 4,458,889 A | | 7/1984 | McPherson et al. |
| 4,607,873 A | * | 8/1986 | Nusbaumer et al. .. 294/119.1 X |
| 4,696,503 A | * | 9/1987 | Collodel ........................ 294/88 |
| 4,705,313 A | * | 11/1987 | Radice ..................... 294/119.1 X |
| 4,723,503 A | * | 2/1988 | Yuda ........................ 294/907 X |
| 4,762,357 A | * | 8/1988 | Bergamo .................. 294/119.1 |
| 4,768,821 A | * | 9/1988 | Hucul et al. ............ 294/907 X |
| 4,793,602 A | | 12/1988 | McPherson |
| 4,874,194 A | | 10/1989 | Borcea et al. |
| 4,955,653 A | * | 9/1990 | Beals ........................ 294/119.1 |
| 5,253,911 A | * | 10/1993 | Egan et al. .................. 294/116 |
| 5,529,359 A | * | 6/1996 | Borcea et al. ........ 294/119.1 X |
| 6,334,641 B1 | * | 1/2002 | Oh ........................... 294/119.1 |

FOREIGN PATENT DOCUMENTS

| | | | | |
|---|---|---|---|---|
| DE | 249668 | * | 9/1987 | .................. 901/36 |
| JP | 18165 | * | 2/1978 | .............. 294/119.1 |
| JP | 284894 | * | 11/1990 | .................. 901/36 |
| US | 804421 | * | 2/1981 | .............. 294/119.1 |

* cited by examiner

Primary Examiner—Johnny D. Cherry
(74) Attorney, Agent, or Firm—Bracewell & Patterson, L.L.P.; Brian F. Russell (57) ABSTRACT An electrically driven gripper has a housing, a gearmotor attached to the housing, a cam engaged to the gearmotor, a pair of opposing jaws slidingly mounted to the housing, a cam follower secured to one of the jaws and in sliding contact with the cam; and a spring configured to impart a force to the jaws such that the jaws are pulled toward each other. The gearmotor drives the cam to force the jaws to a maximum open position. Continued rotation of the cam allows the spring to pull the jaws closed to grasp an object with the jaws. Sensors mounted to the housing determine whether the jaws are in an open or closed state. A simple circuit on a printed circuit board mounted to the housing is used to control the electric gearmotor.

27 Claims, 7 Drawing Sheets

ELECTRIC GRIPPER

BACKGROUND OF THE INVENTION

1. Field of the Invention

This invention pertains to robotic grippers and more particularly to grippers driven by electric motors. Grippers are used to grasp an object so the object can be held or moved to a desired location and orientation.

2. Description of Prior Art

The robotics and automation industry heavily relies on robotic grippers for grasping objects such as mechanical or electrical components so those components can be moved from one place to another or held in a particular orientation. Grippers of various sizes, shapes, and configurations have been used to handle objects ranging in size from as small as electronic components to as large as satellites deployed in or retrieved from low-earth orbit. Grippers can be opposing jaws, ensnaring wires that wrap around a grappling pin, anthropomorphic, hand-like designs, as well as many other specialized shapes.

Grippers may be mounted on highly articulated robotic arms having multiple degrees of freedom, or simple automation devices that may have only one or two degrees of freedom. Generally, highly articulated grippers and robotic arms require complicated control and power systems. The majority of grippers currently used in the automation industry are pneumatically powered. This is primarily due to the significantly greater power obtainable from a pneumatically driven gripper compared to an electrically driven gripper of similar size. Disadvantages of prior versions of electrical grippers include being large, complex, delicate, or expensive.

SUMMARY OF THE INVENTION

The present invention uses an innovative design to produce an electrically driven gripper with high gripping power in a small and relatively inexpensive package. The gripper of the present invention comprises an electrically driven gripper having a housing, a motor attached to the housing, a cam engaged to the motor, a pair of opposing jaws slidingly mounted to the housing, a cam follower secured to one of the jaws and in sliding contact with the cam; and a spring configured to impart a force to the jaws such that the jaws are pulled toward each other. The motor drives the cam to force the jaws to maximum open position. Continued rotation of the cam allows the spring to pull the jaws closed to grasp an object with the jaws. Sensors mounted to the housing determine whether the jaws are in an open or closed state. A simple circuit on a printed circuit board mounted to the housing is used to control the electric motor.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DETAILED DESCRIPTION

Figure 1:
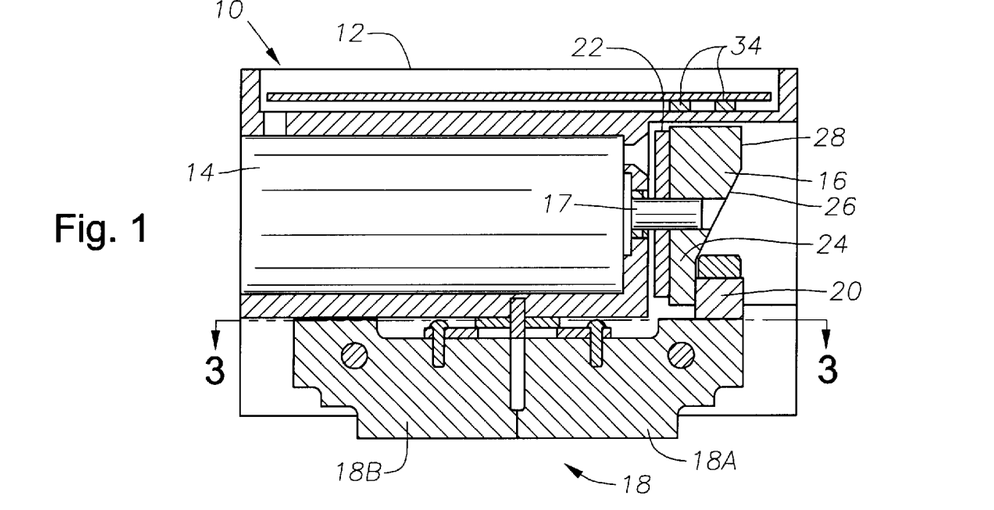
FIG. 1 is a side view of an electric gripper constructed in accordance with the present invention showing the gripper in its maximum closed position.
Figure 2:
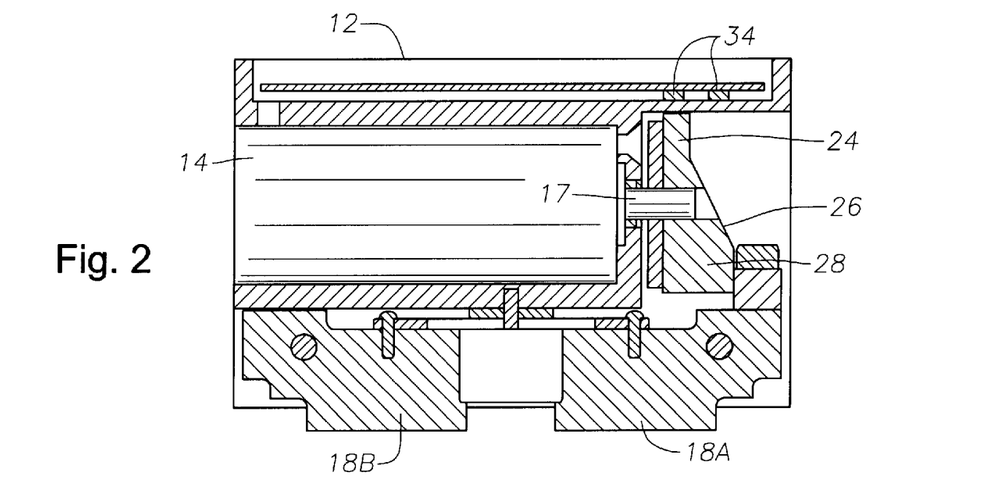
FIG. 2 is a side view of the gripper of FIG. 1, but showing the gripper in its maximum open position.

FIGS. 1 and 2 illustrate an electric gripper 10 comprising housing 12, gearmotor 14, cam 16, jaws 18, and cam follower 20. Housing 12 can be made of any durable, lightweight material, but is preferably metal or another conductive material that can be electrically grounded. Housing 12 serves as a base on and inside of which other structural elements are mounted. The housing 12 also protects the housed components. It is desirable that housing 12 be easily formed into complex shapes to allow for space-efficient integration of various components.

Gearmotor 14 is a conventional electrically driven motor. Gearmotor 14 mounts to housing 12 and serves to drive cam 16. The gearmotor 14 can be replaced by an electric motor and gearbox (e.g., FIG. 10), but better efficiencies and economy of scale are usually achieved in the combined gearmotor 14. The term "gearmotor", as used herein, shall mean either configuration or any type of suitable power source, including a pneumatically driven power source. The motor portion of gearmotor 14 can be virtually any type of electric motor. Different applications may dictate whether the motor is preferably an ac or dc motor, a stepper motor, an induction motor, a brushless motor, or other less common motor type. A dc motor offers the advantages of low cost and simple control requirements, but other requirements may dictate other motor types. Larger motors are generally required for larger grippers.

The gear ratios in the gearbox portion of gearmotor 14 can be chosen to produce a desired rotational rate for the gearmotor output shaft 17. The rotational rate of output shaft 17 can be chosen in conjunction with the size and profile of cam 16 to produce a particular opening or closing rate for jaws 18, as will be further explained below.

In the preferred embodiment of FIG. 1, cam 16 is rotationally joined to output shaft 17 by thrust bearing 22. Thrust bearing 22 serves to isolate the relatively weak bearings of gearmotor 14 from loads transmitted through cam 16. Cam 16 undergoes heavy loading while opening jaws 18.

Cam 16 is variously shaped depending on application and particular embodiment chosen. Again referring to the preferred embodiment of FIG. 1, cam 16 is a circular disk with a canted profile on its end face opposite thrust bearing 22. FIG. 1 shows cam 16 having a narrow, flat portion 24, a tapered portion 26, and a wide, flat portion 28.

As cam 16 is rotated, cam follower 20 tracks the profile of cam 16. Cam follower 20 is in constant sliding or rolling contact with cam 16 unless an object is grasped by jaws 18. In such event, a gap may develop between cam 16 and cam follower 20, as explained below. Cam follower 20 is preferably a roller attached to one of the jaws 18A.

Figure 3:
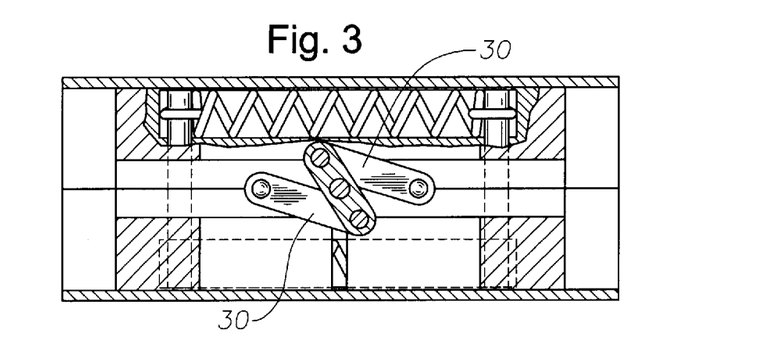
FIG. 3 is a top partial cross section view of the gripper of FIG. 1.

The jaws 18 of FIG. 1 are linked by centering linkages 30, illustrated in FIG. 3. Thus, jaws 18 move in oppositely directed, but synchronized motion. Because cam follower 20 is attached to jaw 18A, cam follower 20 and jaw 18A move as one body. Through linkages 30, the force applied to jaw 18A is transmitted to jaw 18B, but in an opposite sense. Thus, jaw 18B moves in an exactly opposite manner from jaw 18A.

Figure 4:
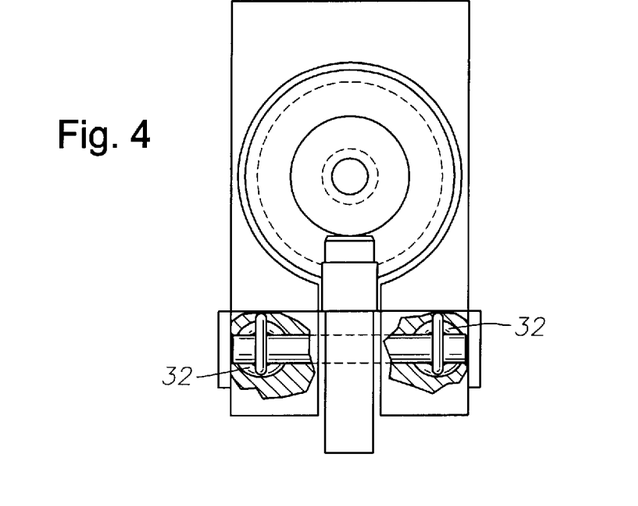
FIG. 4 is an end view of the gripper of FIG. 1.
Figure 7:
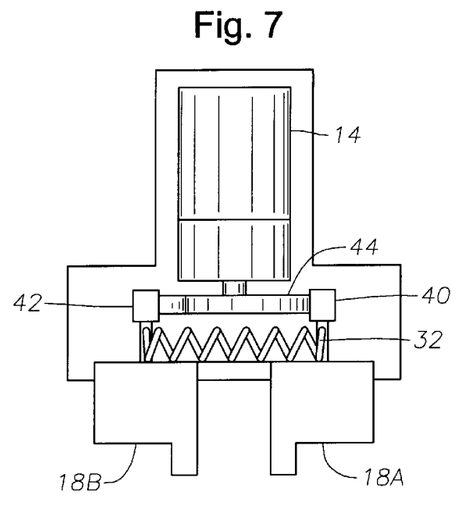
FIG. 7 is a side view of a second alternative embodiment of an electric gripper constructed in accordance with the present invention showing the gripper in its maximum open position.

FIG. 4 shows an end view of springs 32 and FIG. 7 shows the conceptual equivalent to springs 32. Springs 32 attach to jaw 18A and jaw 18B at the respective ends of springs 32. That is, the springs 32 attach to jaws 18 such that jaws 18 are pulled toward each other as springs 32 seek to return to their natural (unstretched) length. The spring force from springs 32 acts as a closing force, pulling jaws 18 closed so the jaws 18 can grasp an object.

In the preferred embodiment of FIG. 2, springs 32 (not shown) alone supply the closing force to allow jaws 18 to grasp an object. In alternative embodiments described below, springs 32 may be replaced by alternative structure or functional arrangement. However, an advantage offered by springs 32 providing the closing force is that cam 16 can be rotated to a particular position regardless of whether jaws 18 are grasping an object.

While other structural elements can be added, the elements described above permit a description of the operation of the preferred embodiment of gripper 10. FIG. 1 shows gripper 10 with jaws 18 fully closed. Springs 32 (not shown) hold jaws 18 closed, the spring force being at a minimum, but greater than zero. That is, springs 32 are slightly stretched even when jaws 18 are in their fully closed position.

Note the position of cam 16 and cam follower 20 shown in FIG. 1. Cam 16 is positioned so that its narrow portion 24 is in contact with cam follower 20. This configuration permits the jaws 18 to fully close if no object is being held by jaws 18. To open jaws 18, cam 16 is rotated by gearmotor 14. Such rotation brings tapered portion 26 of cam 16 to bear against cam follower 20. Tapered portion 26 displaces cam follower 20 and jaw 18A, and thus jaw 18B as well, away from the closed position. Recall jaw 18B mirrors the motion of jaw 18A because of linkages 30. Jaws 18 are forced open by further rotation of cam 16 until cam follower 20 contacts the wide portion 28 of cam 16, as shown in FIG. 2. Jaws 18 are fully open in this configuration and springs 32 are in their most stretched position. Thus, to open jaws 18, gearmotor 14 must be able to rotate cam 16, overcoming the spring force tending to close jaws 18.

To grasp an object, jaws 18 are initially set to their fully open position, as in FIG. 2. In that configuration, cam 16 is oriented such that cam follower 20 is precisely centered in wide portion 28. Once the object is between jaws 18, cam 16 is rotated so tapered portion 26 comes to bear against cam follower 20. Further rotation of cam 16 presents a narrowing profile to cam follower 20, and springs 32 pull jaws 18 together, keeping cam follower 20 in contact with cam 16. When jaws 18 contact the object, further closing of jaws 18 is restricted by the object itself. Springs 32 hold jaws 18 in place, gripping the object. Motion of cam 16, however, is not impeded and such rotation continues until cam 16 reaches the precise orientation corresponding to the fully closed position of jaws 18. Thus, cam follower 20 ceases to be in contact with cam 16 once jaws 18 contact the object and cam 16 is rotated to the fully closed orientation.

To release the object, cam 16 is rotated in the same direction as when closing jaws 18. There is essentially no load on cam 16 until it engages cam follower 20. At that point, cam follower 20 again begins to track cam 16 and jaws 18 are displaced by cam 16. Thus, the object is released and cam 16 is rotated until jaws 18 reach their fully open position.

Both narrow portion 24 of cam 16 and wide portion 28 of cam 16 have flat areas in which the fully closed and fully open positions are centered, respectively. The flat areas eliminate any torque being applied from cam follower 20 onto cam 16. This allows gearmotor 14 to be turned off while cam 16 is in the fully open or fully closed configuration.

Figure 16:
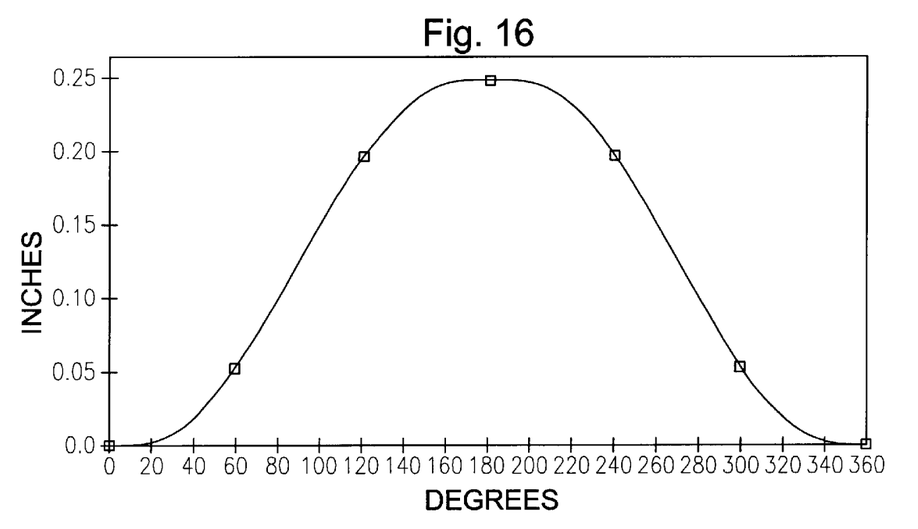
FIG. 16 is a graph showing the displacement of a cam follower as a function of the rotational angle of the cam for a cam having a first profile constructed in accordance with the gripper of FIG. 1.

The particular cant of cam 16, in conjunction with the gearmotor output rotational rate, determines the amount and rate of displacement of jaws 18. The cant and spring constant can be varied to achieve a desired closing force. The cant profile can be symmetrical or asymmetrical. FIG. 16 shows the displacement of cam follower 20 as a function of rotation of cam 16 for a symmetrical cant profile. The angular position of zero degrees corresponds to the fully closed position of jaws 18. As cam 16 is initially rotated, there is no displacement because of the flat area on the narrow portion 24 of cam 16. Once cam 16 rotates enough to bring tapered portion 26 to bear on cam follower 20, cam follower 20 is displaced. The displacement increases until cam 16 is rotated nearly 180 degrees. The displacement reaches its maximum just prior to 180 degrees and remains constant until rotated slightly past 180 degrees because of the flat area on wide portion 28 of cam 16. Jaws 18 are fully open while cam follower 20 is on the flat area in the neighborhood of 180 degrees. The displacement decreases with further rotation of cam 16 as cam follower 20 tracks tapered portion 26 until cam follower 20 again encounters the flat area on the narrow portion 24 of cam 16. At that point, there is no further displacement as cam 16 is rotated to 360 degrees, returning jaws 18 to their fully closed position.

Figure 17:
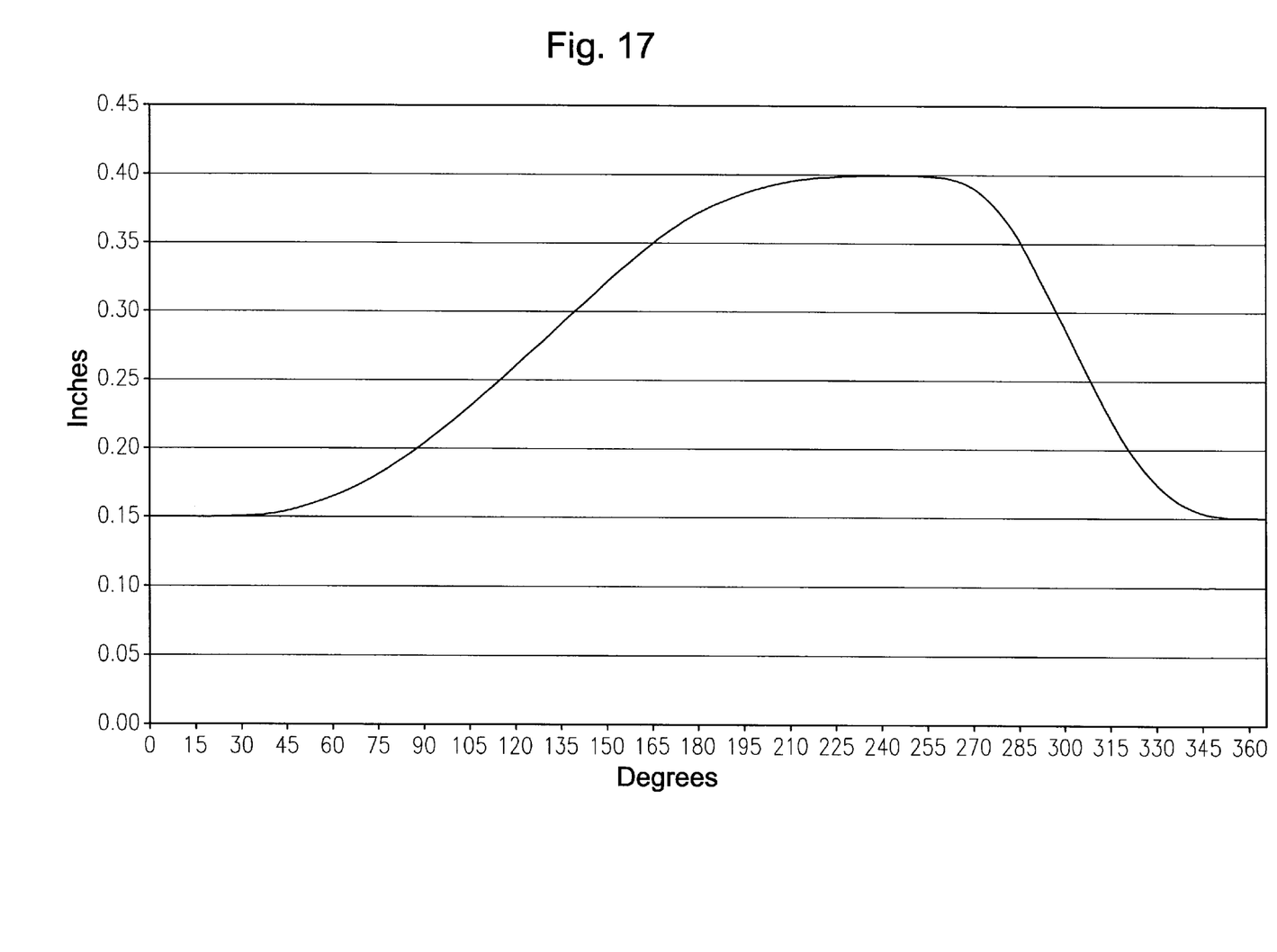
FIG. 17 is a graph showing the displacement of a cam follower as a function of the rotational angle of the cam for a cam having a second profile constructed in accordance with the gripper of FIG. 1.

A symmetrical cant profile tends to waste motor power because much more power is necessary to open jaws 18 than to close them. The force of springs 32 must be overcome to open jaws 18. However, the force to close jaws 18 comes from springs 32; gearmotor 14 essentially coasts during that portion of the operational cycle. Thus, a more power-efficient cant profile is an asymmetrical one. That is, efficiency is gained by using a cant profile in which a greater percentage of circumference is dedicated to opening jaws 18 than to their closing. FIG. 17 shows how such an arrangement skews the displacement versus rotation curve. The mechanical advantage gained by using a longer ramp allows a less powerful gearmotor to be used.

The above description for an asymmetrical cant profile applies to embodiments using springs 32 to close jaws 18. Some alternative embodiments, such as those described below, do not use springs 32 to close jaws 18. However, it may still be desirable to use an asymmetrical profile. In those embodiments, the mechanical advantage is analogous to that of a screw. The cant, analogous to the pitch (or lead), can be varied to produce a greater closing force than opening force.

The above-described structure and operation describe a preferred embodiment of gripper 10 in a basic form. Gripper 10 can be made "smarter" and more user-friendly by including sensors, indicator lights, and control circuitry. Cam orientation sensor 34 can sense when cam 16 is rotated to the fully open or fully closed orientation. A part presence proximity sensor (not shown) can be included to sense whether gripper 10 successfully grasped an object or if it missed. Light emitting diodes can be mounted to a circuit board to indicate conditions such as the presence of power or motor movement.

Figure 15:
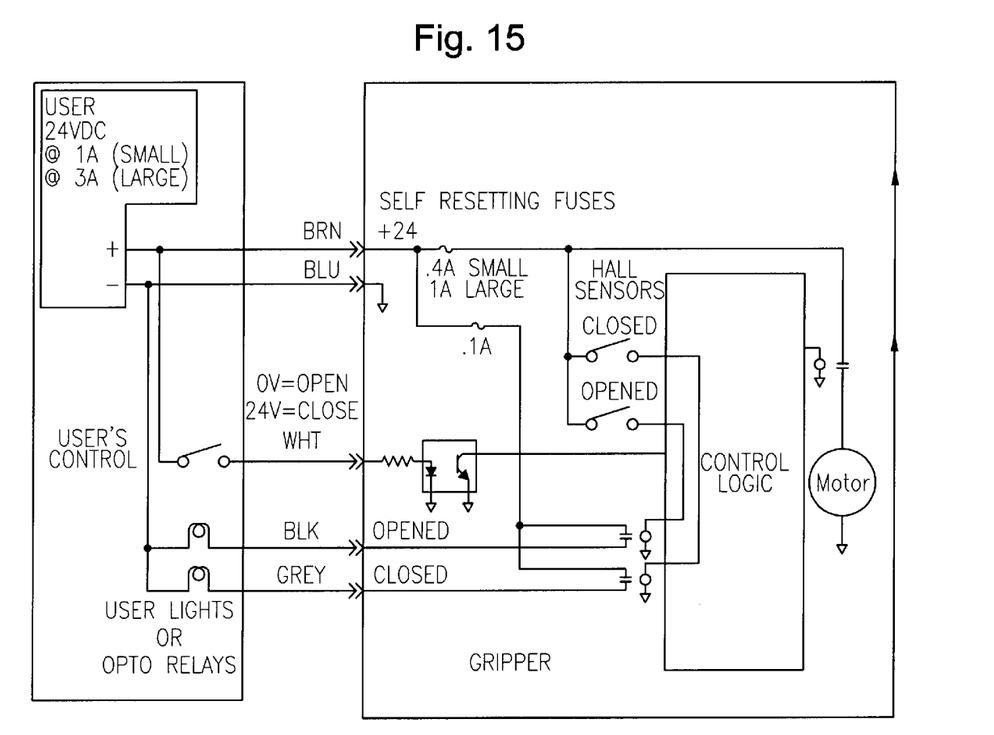
FIG. 15 is a schematic diagram of a control circuit constructed in accordance with the present invention.

FIG. 15 shows a schematic diagram of an inexpensive, reliable circuit to control gearmotor 14. The user can send a control signal to command gearmotor 14 to position cam 16 in the open or closed position. Control logic determines whether to allow power to flow to gearmotor 14 based on the user control signal and current status of cam orientation sensors 34. When cam 16 reaches the desired orientation, gearmotor 14 serves as a brake by temporarily becoming a generator. This is an important feature because it eliminates cam overshoot. If cam 16 were to overshoot the desired orientation, the control logic would continue to seek the desired orientation angle indefinitely.

Figure 5:
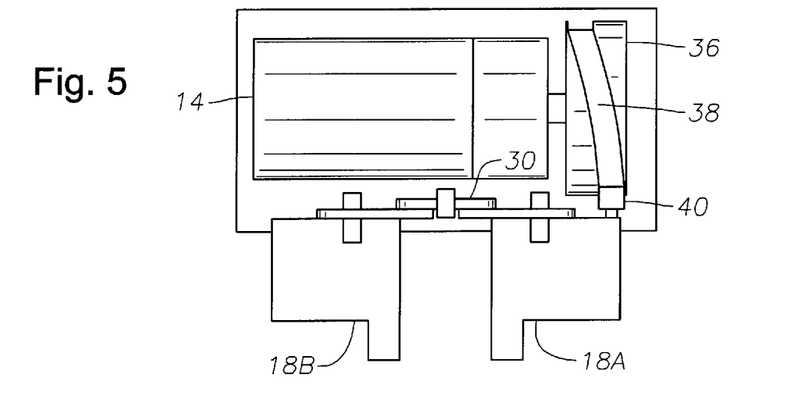
FIG. 5 is a side view of a first alternative embodiment of an electric gripper constructed in accordance with the present invention showing the gripper in its maximum open position.
Figure 6:
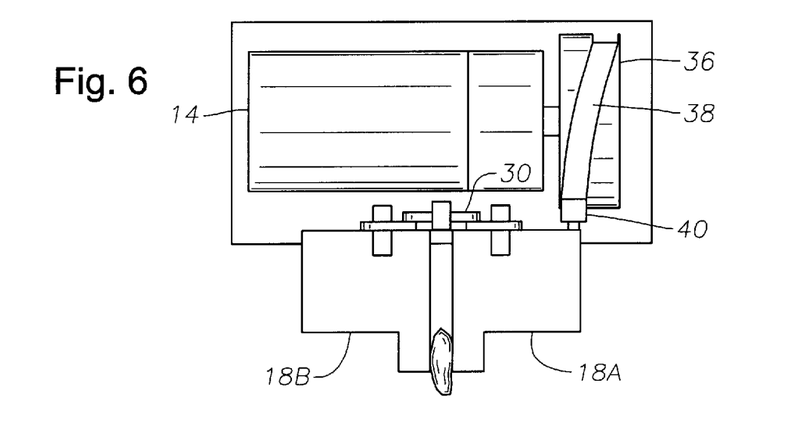
FIG. 6 is a side view of the gripper of FIG. 5, but showing the gripper in a closed position.

Several alternative embodiments of the present invention are readily conceived. To a large extent, the essential difference between the alternative embodiments is the cam. FIGS. 5 and 6 show a variation in which a cam slot 38 is machined into cam 36. Cam follower 40 is a pin captured by cam slot 38 so that cam follower 40 never loses contact with cam 36. As cam 36 is rotated, cam follower 40 is displaced The motion imparted to cam follower 40 is transferred to jaws 18 as before. In this embodiment, however, there is no need for springs 32. Jaws 18 are opened and closed solely by gearmotor 14. Cam slot 38 can be designed so that more of the cam rotation is used to close jaws 18 than to open them. This allows the maximum closing force to be supplied to jaws 18. However, because cam follower 40 never loses contact with cam 36, gearmotor 14 will stall when an object is grasped. Therefore, appropriate current detection circuitry is required to limit current to gearmotor 14 to prevent gearmotor 14 from overheating or self-destructing. To release an object, the drive direction of gearmotor 14 must be reversed.

Figure 8:
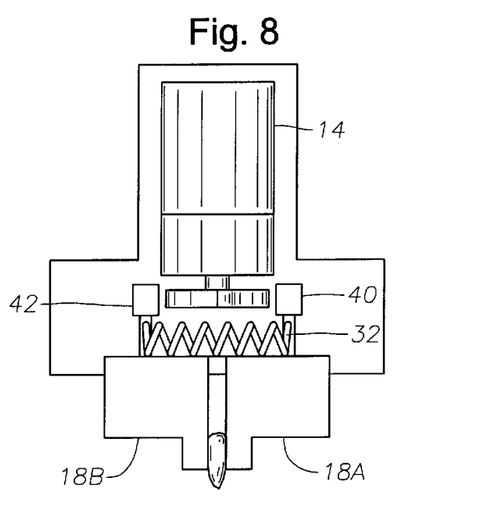
FIG. 8 is a side view of the gripper of FIG. 7, but showing the gripper in a closed position.
Figure 9:
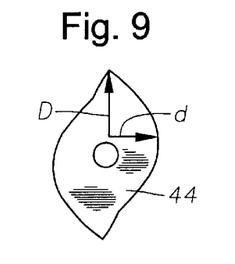
FIG. 9 is a top view of the cam of FIG. 7.

FIGS. 7 and 8 show an embodiment in which linkages 30 are eliminated and jaw 18B has its own cam follower 42. FIG. 9 shows a cam 44 having a variable diameter. In this embodiment, cam 44 has an axis of rotation that is perpendicular to the displacement of cam followers 40 and 42. The cam profile can be varied to achieve different objectives such as increased opening force or rapid closing of jaws 18. FIG. 7 shows gripper 10 in its fully opened position. This is achieved by rotating cam 44 so that cam followers 40 and 42 are separated by the maximum diameter "D" of cam 44. The fully closed position would correspond to cam 44 being rotated so that cam followers 40 and 42 are separated by the minimum diameter "d".

FIG. 8 shows an object being grasped by this embodiment. Similar to the embodiment of FIG. 1, springs 32 supply the closing force to jaws 18. Because cam followers 40 and 42 are not captured in a cam slot, they lose contact with cam 44 as soon as jaws 18 contact the object. Thus, this embodiment has operational features similar to the embodiment of FIG. 1, such as the ability to drive gearmotor 14 in only one direction to open and close jaws 18. However, the embodiment of FIG. 7 could be modified so that cam 44 captures cam followers 40 and 42. This would eliminate the need for springs 32 and more closely resemble the operational features of the embodiment of FIG. 5.

Figure 10:
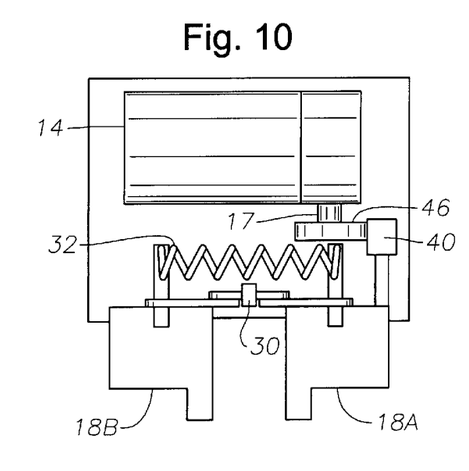
FIG. 10 is a side view of a third alternative embodiment of an electric gripper constructed in accordance with the present invention showing the gripper in its maximum open position.
Figure 11:
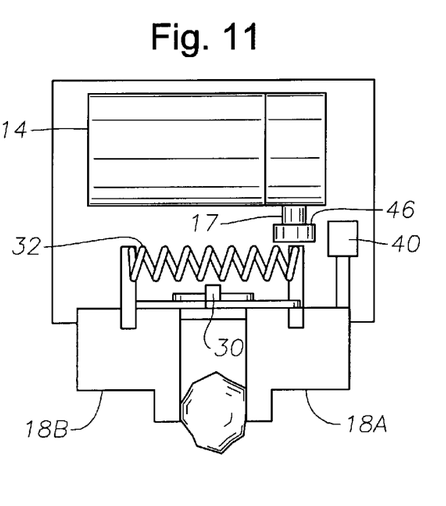
FIG. 11 is a side view of the gripper of FIG. 10, but showing the gripper in a closed position.

FIGS. 10 and 11 show an arrangement in which output shaft 17 is at a right angle to the motor shaft (not shown). This may be useful to reduce the overall length of gripper 10. A single cam follower 40 is used, along with linkages 30 and springs 32. This embodiment is operationally similar to the embodiment of FIG. 1. Springs 32 serve to close jaws 18 and linkages 30, in conjunction with the displacement of cam follower 40, serve to move the jaws in opposing directions. Jaws 18 are opened by cam 46 as it is rotated by output shaft 17.

Figure 12:
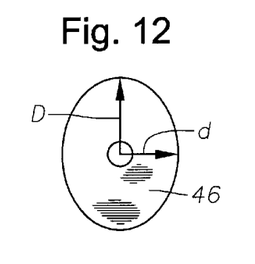
FIG. 12 is a top view of the cam of FIG. 10.

FIG. 12 shows cam 46 as having a variable diameter perpendicular to its axis of rotation, similar to that of FIG. 9, but with an elliptical profile. The elliptical profile is yet another example of variability of cam profile to achieve different objectives. The symmetrical profile yields a correspondingly symmetrical displacement of jaws 18. The major and minor axes can be varied to modify the throw or opening/closing rate of jaws 18. Recall, an advantage to configurations using springs 32 to supply the closing force, and that allow cam follower 40 to lose contact with cam 46 upon contact by jaws 18 with an object, is that cam 46 can always be driven to a precise orientation, such as fully open or fully closed, thus simplifying the control system. However, as before, the design can be modified so that cam follower 40 is captured by cam 46.

Figure 13:
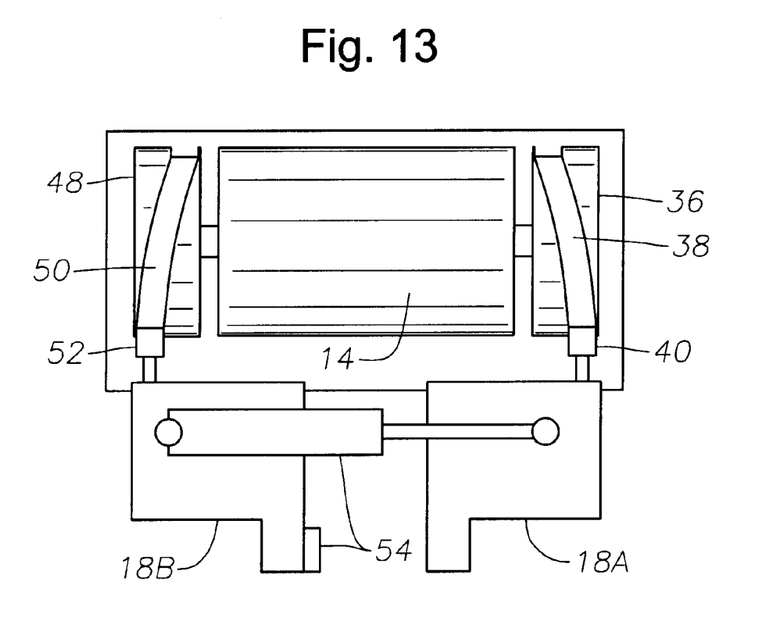
FIG. 13 is a side view of a fourth alternative embodiment of an electric gripper constructed in accordance with the present invention showing the gripper in its maximum open position.
Figure 14:
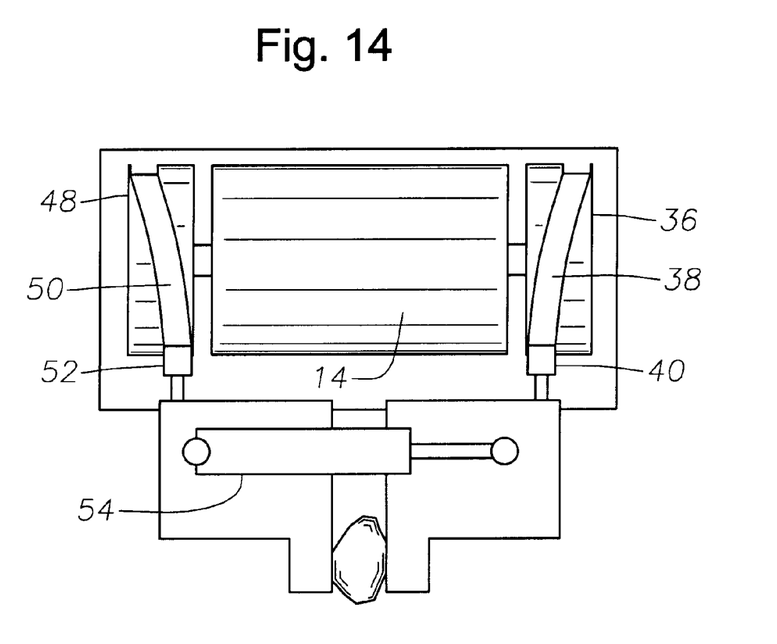
FIG. 14 is a side view of the gripper of FIG. 13, but showing the gripper in a closed position.

FIGS. 13 and 14 show an embodiment that is operationally similar to that of FIG. 5. The embodiment of FIG. 13, however, uses a second cam 48 with a second cam slot 50 and second cam follower 52, eliminating linkages 30 and springs 32. The embodiment of FIG. 13 also shows a measurement device 54. Measurement device 54 can be, for example, a micrometer, a magnetorestrictive position sensor, an encoder, or potentiometer. A measurement could be made while the object is being moved to a drop off position.

Additionally, measurement device 54 could be embedded in jaws 18 to measure physical attributes such as pH, color, or temperature.

Figure 18:
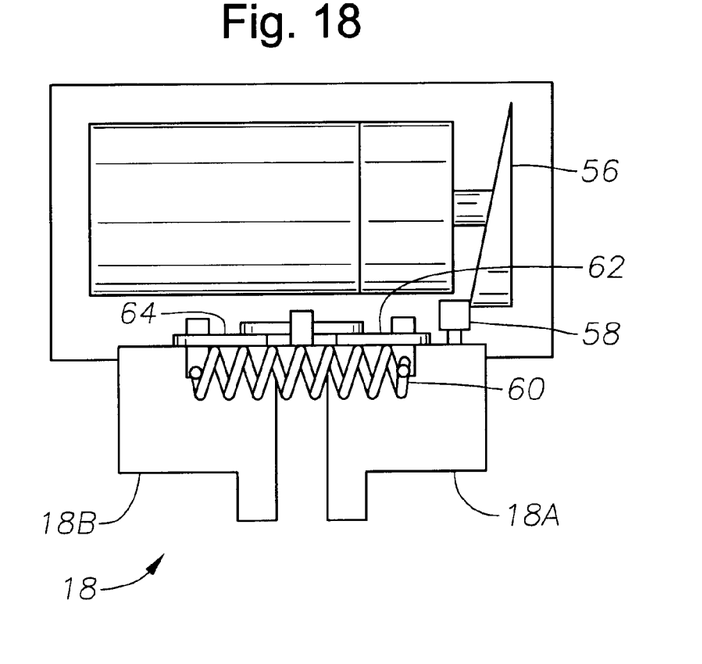
FIG. 18 is a side view of an electric gripper constructed in accordance with the present invention showing a gripper designed to grip from within the interior region of an object in its maximum open position.
Figure 19:
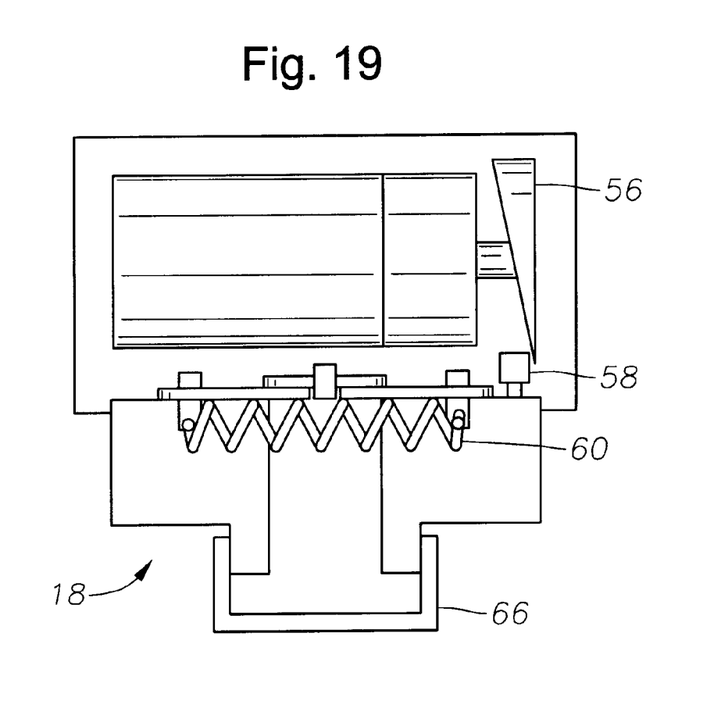
FIG. 19 is a side view of the gripper of FIG. 18, but showing the gripper in its maximum closed position.

Any of the above-described embodiments can be modified so jaws 18 move apart to grasp an object from within the object's interior region, such as along an inner diameter or the inside walls of a channel. FIGS. 18 and 19 illustrate a representative embodiment for such modified versions. FIG. 18 shows cam 56 displacing cam follower 58 in a manner that compresses spring 60 and moves jaws 18 together. As before, linkages 62, 64 coordinate a reciprocal motion between jaws 18A and 18B. In that configuration, jaws 18 can be inserted into the interior region of an object.

FIG. 19 shows cam 56 rotated to allow spring 60 to separate jaws 18. Jaws 18 separate until contacting the interior walls of channel 66. Cam follower 58 loses contact with cam 56 as cam 56 rotates to the "fully closed" position. Spring 60 is compressed throughout the entire operational cycle of this embodiment.

The present invention offers many advantages over the prior art. For example, for those embodiments using springs to close jaws 18, there is less chance of gears being stripped due to excessive motor force. Those embodiments also allow a very simple controller, or even no controller, to be used. The motor need be driven in only one direction to open and close jaws 18, and can be driven to precise orientation without regard to whether an object is grasped by jaws 18. Those embodiments are simple, inexpensive, fast, and powerful.

Those embodiments that do not use springs offer advantages as well. Gripping force of jaws 18 can be actively controlled by the motor. Also, different cant profiles are available because there is no spring force to overcome.

While the invention has been particularly shown and described with reference to a preferred and alternative embodiments, it will be understood by those skilled in the art that various changes in form and detail may be made therein without departing from the spirit and scope of the invention.

What is claimed is:

1. A gripper comprising:
    a housing;
    a motor attached to the housing;
    a cam engaged to the motor for rotation by the motor about an axis, wherein the cam has a contact surface having a plurality of portions that vary in axial position;
    a pair of opposing jaws slidingly mounted to the housing, wherein the jaws are axially slidable toward and away from each other along a line parallel to the axis; and
    at least one cam follower secured to one of the jaws that engages the contact surface of the cam to axially slide the jaws in response to rotation of the cam.

2. The gripper of claim 1 further comprising a spring configured to impart a force to the jaws such that the jaws are urged toward each other.

3. The gripper of claim 2 in which the plurality of portions of the contact surface include a first portion that imparts no displacement to the cam follower, a second portion adjacent to the first portion that displaces the cam follower to open the jaws, a third portion adjacent to the second portion that imparts no displacement to the cam follower, and a fourth portion adjacent to the third and first portions that allows the spring to urge the jaws together, the second portion having a greater radial perimeter length than the fourth portion.

4. The gripper of claim 1 further comprising one or more sensors mounted on the housing in proximity to the cam that sense an open state for the gripper and a closed state for the gripper.

5. The gripper of claim 1, wherein the contact surface of the cam forms at least a portion of an end surface of the cam defining an ultimate axial extent of the cam.

6. The gripper of claim 5, wherein the plurality of portions of the contact surface include a first portion that imparts no displacement to the cam follower, a second portion adjacent to the first portion that displaces the cam follower to open the jaws, a third portion adjacent to the second portion that imparts no displacement to the cam follower, and a fourth portion adjacent to the third and first portions that allows the spring to urge the jaws together.

7. The gripper of claim 1, wherein:
    the cam has a cam slot formed in its outer radial surface;
    the cam slot has at least one sidewall;
    the cam follower moves within the slot; and
    the contact surface comprises the at least one sidewall of the cam slot.

8. The gripper of claim 1 in which said at least one cam follower comprises a pair of cam followers, wherein said cam comprises one or more cams, and wherein each of said pair of cam followers is secured to one of the opposing jaws and contacts a cam among the one or more cams.

9. The gripper of claim 1, wherein:
    the gripper further comprises a linkage linking the opposing jaws so the jaws move in opposite relative motion;
    the cam comprises a single cam; and
    the at least one cam follower comprises a single cam follower secured to one of the jaws.

10. The gripper of claim 1, wherein the contact surface and cam follower are arranged such that said cam follower disengages from the rotating contact surface of the cam if said opposing jaws are maintained in fixed relation between fully opened and fully closed positions by a gripped object.

11. The gripper of claim 10, wherein:
    said motor includes a motor controller;
    said gripper further comprises at least one sensor that provides a signal to said motor controller indicative of a rotational position of the cam; and
    said motor controller halts rotation of the cam by the motor responsive to the signal while the opposing jaws are maintained in fixed relation between fully opened and filly closed positions by the gripped object.

12. An electric gripper comprising:
    a housing;
    a motor attached to the housing and having an output shaft;
    a cam rotationally driven by the shaft of the motor about an axis;
    a pair of opposing jaws mounted to the housing for axial sliding movement toward and away from each other along a line parallel to the axis;
    a linkage linking the opposing jaws so the jaws move in opposite relative motion;
    at least one cam follower secured to one of the jaws that engages the cam to axially slide the jaws away from each other in response to rotation of the cam; and
    a spring configured to impart a force to the jaws such that the jaws are biased toward each other.

13. The gripper of claim 12, wherein a contact surface of the cam forms at least a portion of an end surface of the cam defining an ultimate axial extent of the cam.

14. The gripper of claim 12 in which the cam has an outer radial surface within which a cam slot is formed in which the cam follower moves.

15. The gripper of claim 12 in which said at least one cam follower comprises a pair of cam followers, wherein said cam comprises one or more cams, and wherein each of said pair of cam followers is secured to one of the opposing jaws and contacts a cam among the one or more cams.

16. The gripper of claim 12 in which the cam has a first portion that imparts no displacement to the cam follower, a second portion adjacent to the first portion that displaces the cam follower to open the jaws, a third portion adjacent to the second portion that imparts no displacement to the cam follower, and a fourth portion adjacent to the third and first portions that allows the spring to close the jaws, the second portion having a greater radial perimeter length than the fourth portion.

17. A gripper comprising:
 a housing;
 a motor attached to the housing;
 a cam engaged to the motor for rotation by the motor about an axis, said cam having a contact surface;
 a pair of opposing jaws slidingly mounted to the housing for axial sliding movement;
 at least one cam follower secured to one of the jaws that engages the contact surface of the cam to axially slide the jaws in response to rotation of the cam;
 a spring configured to impart a force to the jaws such that the jaws are biased toward each other;
 wherein said contact surface includes:
  a first portion that imparts no displacement to the cam follower;
  a second portion adjacent to the first portion that displaces the cam follower to open the jaws;
  a third portion adjacent to the second portion that imparts no displacement to the cam follower; and
  a fourth portion adjacent to the third and first portions that allows the spring to urge the jaws together.

18. The gripper of claim 17 further comprising one or more sensors mounted on the housing in proximity to the cam that sense an open state for the gripper and a closed state for the gripper.

19. The gripper of claim 17 further comprising a linkage linking the opposing jaws so the jaws move in opposite relative motion.

20. The gripper of claims 17, wherein:
 the cam has a cam slot formed in its outer radial surface;
 the cam slot has at least one sidewall;
 the cam follower moves within the slot; and
 the contact surface comprises the at least one sidewall of the cam slot.

21. An electric gripper comprising:
 a housing;
 a motor attached to the housing and having an output shaft;
 a cam rotationally driven by the shaft of the motor;
 a pair of opposing jaws mounted to the housing for sliding movement toward and away from each other;
 a linkage linking the opposing jaws so the jaws move in opposite relative motion;
 at least one cam follower secured to one of the jaws and in contact with the cam for urging the jaws toward each other; and
 a spring configured to impart a force to the jaws such that the jaws are biased away from each other.

22. The gripper of claim 21 in which the cam has an end face normal to the shaft that is canted, the end face being engaged by the cam follower.

23. The gripper of claim 21 in which the spring is a coil spring attached to the jaws.

24. A gripper comprising:
 a housing;
 a motor attached to the housing;
 a cam engaged to the motor for rotation by the motor about an axis, wherein the cam has a contact surface having a plurality of portions that vary in axial position;
 a pair of opposing jaws slidingly mounted to the housing, wherein the jaws are axially slidable toward and away from each other along a line parallel to the axis; and
 at least one cam follower secured to one of the jaws that engages the contact surface of the cam to axially slide the jaws, wherein the contact surface and cam follower are arranged such that said cam follower disengages from the rotating contact surface of the cam if said opposing jaws are maintained in fixed relation between fully opened and fully closed positions by a gripped object.

25. The gripper of claim 24, wherein the contact surface of the cam forms at least a portion of an end surface of the cam defining an ultimate axial extent of the cam.

26. The gripper of claim 24, wherein:
 said motor includes a motor controller;
 said gripper further comprises at least one sensor that provides a signal to said motor controller indicative of a rotational position of the cam; and
 said motor controller halts rotation of the cam by the motor responsive to the signal while the opposing jaws are maintained in fixed relation between fully opened and fully closed positions by the gripped object.

27. The gripper of claim 24, wherein the plurality of portions of the contact surface include a first portion that imparts no displacement to the cam follower, a second portion adjacent to the first portion that displaces the cam follower to open the jaws, a third portion adjacent to the second portion that imparts no displacement to the cam follower, and a fourth portion adjacent to the third and first portions that allows a spring to urge the jaws together.

* * * * *